US012542309B2

(12) United States Patent
Lee et al.

(10) Patent No.: US 12,542,309 B2
(45) Date of Patent: Feb. 3, 2026

(54) BATTERY CELL FOR EVALUATING LITHIUM PRECIPITATION BEHAVIOR, AND METHOD FOR MANUFACTURING SAME

(71) Applicant: LG ENERGY SOLUTION, LTD., Seoul (KR)

(72) Inventors: Suk Woo Lee, Daejeon (KR); Han Young Lee, Daejeon (KR); Dong Sik Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 688 days.

(21) Appl. No.: 17/768,897

(22) PCT Filed: Jan. 20, 2021

(86) PCT No.: PCT/KR2021/095025
§ 371 (c)(1),
(2) Date: Apr. 14, 2022

(87) PCT Pub. No.: WO2021/206534
PCT Pub. Date: Oct. 14, 2021

(65) Prior Publication Data
US 2024/0097220 A1   Mar. 21, 2024

(30) Foreign Application Priority Data

Apr. 10, 2020  (KR) .................. 10-2020-0043731

(51) Int. Cl.
*H01M 10/48* (2006.01)
*H01M 10/04* (2006.01)
(Continued)

(52) U.S. Cl.
CPC ....... *H01M 10/488* (2013.01); *H01M 10/049* (2013.01); *H01M 10/446* (2013.01);
(Continued)

(58) Field of Classification Search
CPC ....... H01M 10/48–488; H01M 50/105; H01M 50/121–138; H01M 50/202
See application file for complete search history.

(56) References Cited

U.S. PATENT DOCUMENTS

2012/0321923 A1\* 12/2012 Yun ..................... H01M 50/466
429/185
2017/0234930 A1    8/2017 Lee et al.
(Continued)

FOREIGN PATENT DOCUMENTS

CN    109390557 A    2/2019
JP    2012204334 A * 10/2012
(Continued)

OTHER PUBLICATIONS

Espacenet machine translation of JP-2012204334-A (Year: 2012).*
(Continued)

*Primary Examiner* — Kaj K Olsen
(74) *Attorney, Agent, or Firm* — Morgan, Lewis & Bockius LLP

(57) ABSTRACT

A method for manufacturing a battery cell for evaluating a lithium precipitation behavior includes: an electrode assembly preparation step of preparing an electrode assembly to which an overhang region, where a positive electrode protrudes from a negative electrode, is introduced; a battery cell preparation step of preparing a battery cell by accommodating the electrode assembly in a first pouch, injecting an electrolyte solution thereto, and sealing the first pouch; a secondary sealing step of accommodating the battery cell in a second pouch and secondary-sealing the second pouch; a second pouch removing step of performing formation for the secondary-sealed battery cell and removing the second pouch; a gas pocket unit removing step of degassing and re-sealing the battery cell, from which the second pouch has (Continued)

been removed, and removing a gas pocket unit of the first pouch; and a completion step of accommodating the battery cell.

10 Claims, 9 Drawing Sheets

(51) Int. Cl.
  *H01M 10/44* (2006.01)
  *H01M 50/105* (2021.01)
  *H01M 50/119* (2021.01)
  *H01M 50/121* (2021.01)
  *H01M 50/124* (2021.01)
  *H01M 50/186* (2021.01)
  *H01M 50/609* (2021.01)

(52) U.S. Cl.
  CPC ....... *H01M 50/105* (2021.01); *H01M 50/119* (2021.01); *H01M 50/121* (2021.01); *H01M 50/124* (2021.01); *H01M 50/186* (2021.01); *H01M 50/609* (2021.01)

(56) References Cited

U.S. PATENT DOCUMENTS

| | | |
|---|---|---|
| 2017/0309475 A1 | 10/2017 | Kim et al. |
| 2017/0358783 A1 | 12/2017 | Kim |
| 2018/0254440 A1 | 9/2018 | Paz et al. |
| 2019/0051949 A1 | 2/2019 | Shaffer et al. |
| 2020/0127341 A1* | 4/2020 | Paz ................. H01M 10/48 |
| 2020/0136188 A1 | 4/2020 | Park et al. |
| 2021/0020993 A1 | 1/2021 | Jun |

FOREIGN PATENT DOCUMENTS

| | | | |
|---|---|---|---|
| JP | 2013-239263 A | 11/2013 | |
| JP | 2017-510940 A | 4/2017 | |
| JP | 2018-195587 A | 12/2018 | |
| JP | 6801722 B2 | 12/2020 | |
| KR | 10-2006-0034819 A | 4/2006 | |
| KR | 10-2012-0139364 A | 12/2012 | |
| KR | 20140144996 A * | 12/2014 | |
| KR | 10-2016-0048691 A | 5/2016 | |
| KR | 10-2016-0054242 A | 5/2016 | |
| KR | 10-2017-0013189 A | 2/2017 | |
| KR | 10-2017-0023583 A | 3/2017 | |
| KR | 10-1748362 B1 | 6/2017 | |
| KR | 10-2018-0067178 A | 6/2018 | |
| KR | 10-2019-0004641 A | 1/2019 | |
| KR | 10-2019-0031141 A | 3/2019 | |
| KR | 10-2019-0055585 A | 5/2019 | |
| KR | 10-2019-0143253 A | 12/2019 | |
| KR | 10-2020-0019087 A | 2/2020 | |
| WO | WO-2018110067 A1 * | 6/2018 | .......... H01M 10/052 |
| WO | 2019/054667 A2 | 3/2019 | |

OTHER PUBLICATIONS

Espacenet machine translation of KR-20140144996-A (Year: 2014).*
Espacenet machine translation of KR20190004641A (Year: 2019).*
1 Extended European Search Report dated Nov. 27, 2023 issued in application 21784275.6.
International Search Report (with partial translation) and Written Opinion dated Apr. 29, 2021 issued in corresponding International Patent Application No. PCT/KR2021/095025.
Office action dated May 15, 2023 issued in corresponding Japanese Patent Application No. 2022-521482.
Office action dated Sep. 8, 2023 issued in corresponding Chinese Patent Application No. 202180005843.9.
Notice of Allowance dated Nov. 14, 2025, issued in corresponding Korean Patent Application No. 10-2020-0043731.

* cited by examiner

[FIG. 2]

[FIG. 6]
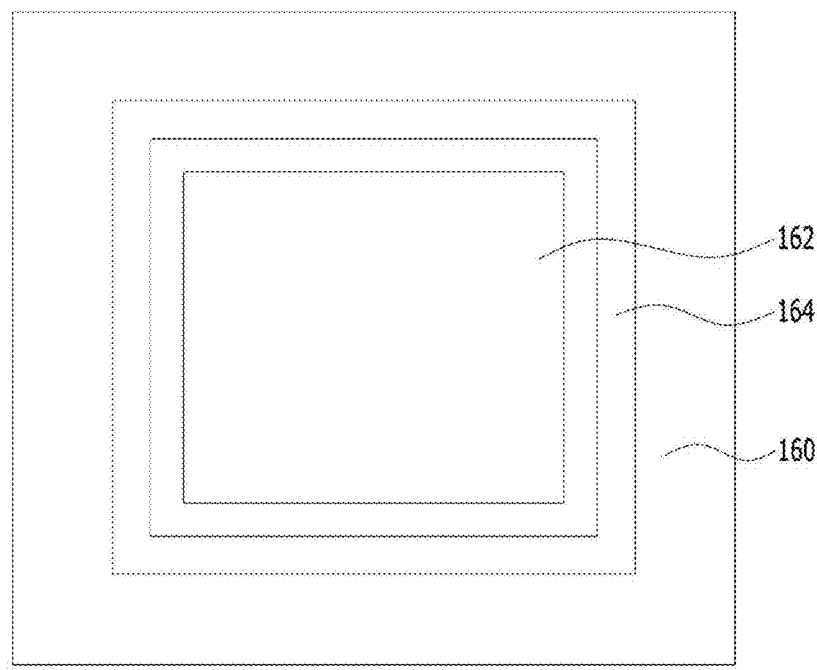

[FIG. 7]
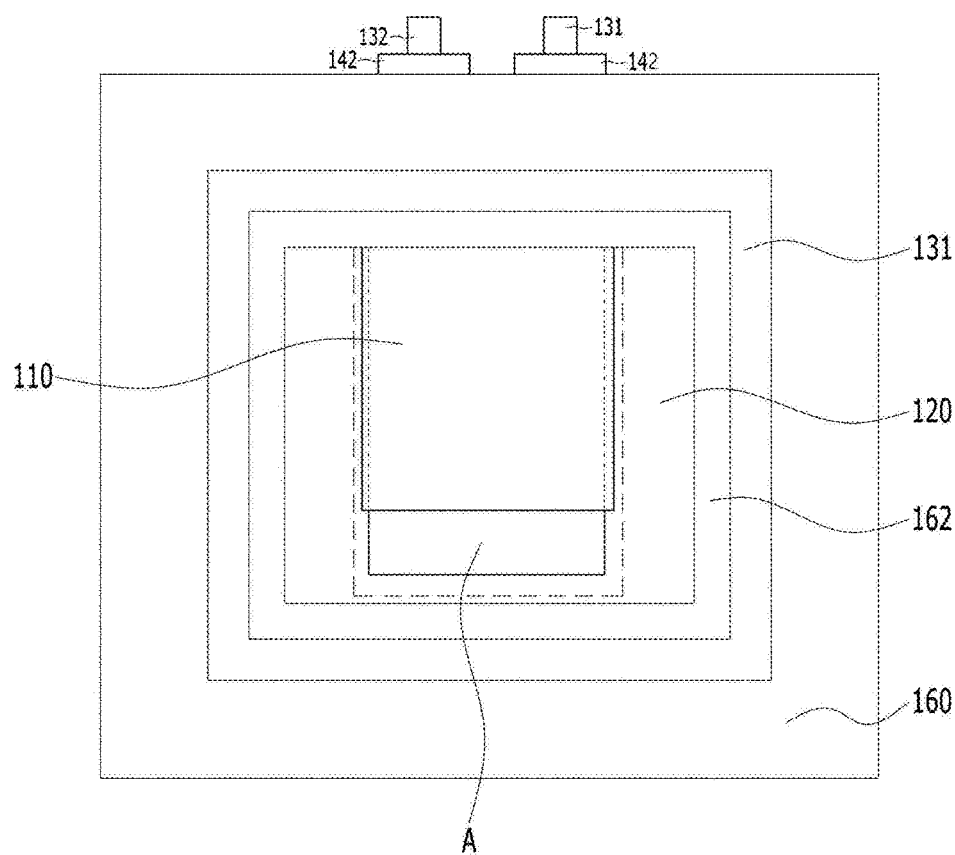

[FIG. 8]
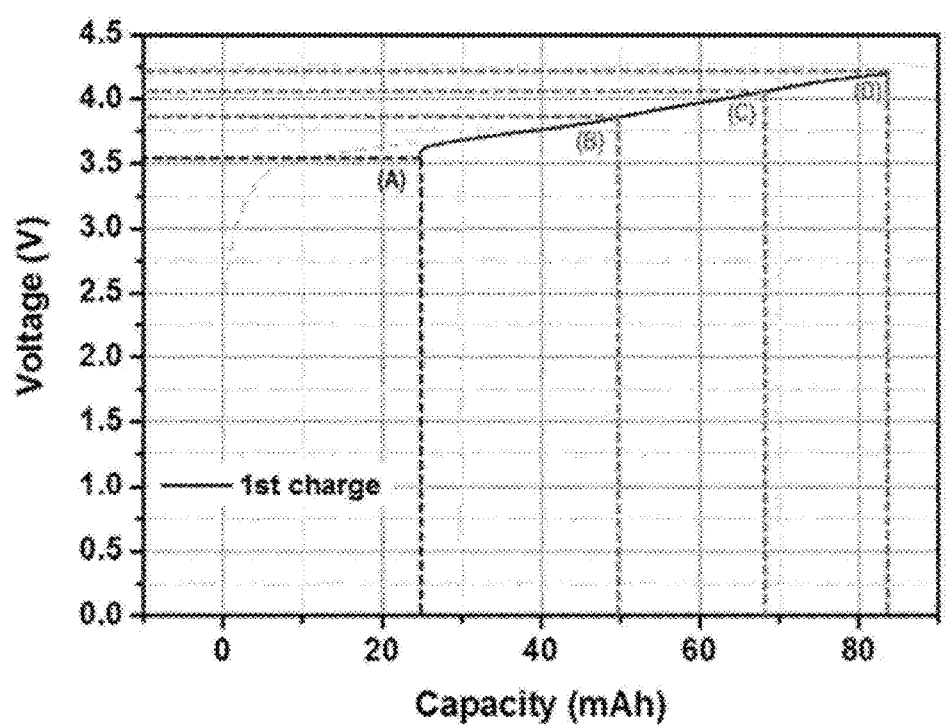

【FIG. 9】
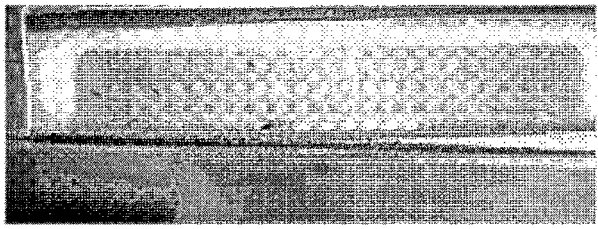

BATTERY CELL FOR EVALUATING LITHIUM PRECIPITATION BEHAVIOR, AND METHOD FOR MANUFACTURING SAME

TECHNICAL FIELD

This application claims the benefit of priority based on Korean Patent Application No. 10-2020-0043731, filed on Apr. 10, 2020, and the entire contents of the Korean patent application are incorporated herein by reference.

The present invention relates to a battery cell for evaluating lithium precipitation behavior generated in an overhang region in real time while performing charge/discharge by preparing an observation window in a battery case, and a method of manufacturing the same.

BACKGROUND ART

In recent years, as demand for portable electronic products such as notebook computers and portable telephones rapidly increases and demand for electric carts, electric wheelchairs, electric bicycles, etc. also increases, studies on high-performance secondary batteries capable of being recharged repeatedly have been actively performed. In recent years, as carbon energy is gradually depleted and the interest in the environment increases, global demand for hybrid electric vehicles (HEV) and electric vehicles (EV) is on the gradual increase. As a result, more studies on secondary batteries for vehicles, which are key components of HEV or EV, are being performed.

Lithium ion secondary batteries are the most realistic technology for these high-performance secondary batteries and secondary batteries for vehicles. The lithium ion secondary battery works as the battery while repeating insertion and desorption of lithium ions in the negative electrode and the positive electrode. There is a lithium salt-containing electrolyte where lithium ions can move, but electrons cannot move.

Particularly, it is necessary to prevent lithium from being precipitated on the surface of the negative electrode. In other words, it is necessary to prevent lithium-plating. The lithium precipitation may become a cause of deterioration of a secondary battery such as a capacity loss due to the side reaction with the electrolyte solution, a change in kinetic balance of the secondary battery, etc., may influence the lifespan of the secondary battery, and may cause a safety problem of losing an overcharge adjusting function.

In order to prevent such lithium precipitation, when preparing an electrode assembly, the area of the negative electrode active material layer is generally set to be greater than the area of the positive electrode active material layer. However, in some electrode assemblies, the region of the negative electrode active material layer does not cover the entire region of the positive electrode active material layer due to the problem in the processes. In such a case, a part of the positive electrode active material layer protrudes from the negative electrode active material layer. This is called a mismatch or overhang of the positive electrode and the negative electrode, and the battery having such an overhang region may come to have a safety problem due to lithium precipitation in the overhang region during the charging.

As such, it is necessary to continually analyze the behavior of the lithium precipitation generated in the overhang region.

However, it is very difficult to know whether lithium precipitation has occurred in real time for secondary batteries. Some examples of conventional technologies for non-destructively detecting lithium precipitation in the negative electrode include a discharge at a low temperature, a heat capacity analysis, a thickness increase analysis, etc. However, the measurement is not performed in the environment where the secondary battery is used. Hence, it is necessary to secure a technology for evaluating and analyzing lithium precipitation behavior in real time in a non-destructive manner in an environment where the secondary battery is actually used.

DISCLOSURE

Technical Problem

As such, the present invention has been made to solve the above problems, and an object of the present invention is to provide a battery cell for electrochemically evaluating lithium precipitation behavior in an environment where secondary batteries are actually used, a method of manufacturing the same, and a technology of electrochemically evaluating and analyzing secondary batteries according to the lithium precipitation behavior by using the same.

Technical Solution

A method for manufacturing a battery cell for evaluating a lithium precipitation behavior of the present invention for achieving the above purpose includes: an electrode assembly preparation step (S10) of preparing an electrode assembly to which an overhang region, where a positive electrode protrudes from a negative electrode, is introduced; a battery cell preparation step (S20) of preparing a battery cell by accommodating the electrode assembly in a first pouch, injecting an electrolyte solution thereto, and sealing the first pouch; a secondary sealing step (S30) of accommodating the battery cell in a second pouch and secondary-sealing the second pouch; a second pouch removing step (S40) of performing formation for the secondary-sealed battery cell and removing the second pouch; a gas pocket unit removing step (S50) of degassing and re-sealing the battery cell, from which the second pouch has been removed, and removing a gas pocket unit of the first pouch; and a completion step (S60) of accommodating the battery cell, from which the gas pocket unit has been removed, in a third pouch having an observation window, and sealing the third pouch.

In an embodiment of the present invention, the electrode assembly includes one or a plurality of bi-cell units having a structure of a positive electrode/negative electrode/positive electrode or monocell units having a structure of a positive electrode/negative electrode.

In an embodiment of the present invention, a positive electrode lead and a negative electrode lead included in the electrode assembly are covered by first to third lead films, respectively, and the third lead film is closest to the electrode assembly and the first lead film is farthest to the electrode assembly.

In an embodiment of the present invention, in the battery cell preparation step (S20), the first pouch and the third lead film are sealed together.

In an embodiment of the present invention, in the secondary sealing step (S30), the second pouch and the first lead film are sealed together.

In an embodiment of the present invention, in the completion step (S60), the third pouch and the second lead film are sealed together.

In an embodiment of the present invention, the first pouch is a pouch made of a transparent polyethyleteretephthalate or polypropylene material.

In an embodiment of the present invention, the second pouch is a pouch of a laminate sheet including a barrier layer of aluminum.

In an embodiment of the present invention, the third pouch is a pouch of a laminate sheet including a barrier layer of aluminum, and in the third pouch, a through hole is formed on a portion corresponding to the overhang region, and the through hole is covered with an acrylic film to thereby form an observation window.

A method for evaluating a lithium precipitation behavior according to the present invention includes: a step of manufacturing a battery cell for evaluating a lithium precipitation behavior; and a step of charging and discharging the battery cell and observing the lithium precipitation behavior in the overhang region through the observation window in real time.

A battery cell for evaluating lithium precipitation behavior of the present invention is a battery cell which is generated by sealing a battery cell, which is sealed by a transparent pouch after accommodating an electrolyte solution and an electrode assembly, into which an overhang region where a positive electrode plate protrudes from a negative electrode plate is introduced, by a pouch of aluminum laminate sheet. Herein, the pouch of the aluminum laminate sheet includes an observation window at a portion corresponding to the overhang region. Further, lithium precipitation behavior is checked in the overhang region through the observation window, and electrochemical evaluation for the lithium precipitation behavior is performed.

In an embodiment of the present invention, the transparent pouch is made of polyethylene terephthalate or polypropylene.

In an embodiment of the present invention, the observation window is formed by covering a through hole, which is formed at a portion corresponding to the overhang region in the pouch of the aluminum laminate sheet, with a transparent film.

In an embodiment of the present invention, the transparent film is an acrylic film.

In an embodiment of the present invention, the transparent film is attached on the pouch of the aluminum laminate sheet by using a polyimide adhesive tape.

Advantageous Effects

According to a battery cell for evaluating lithium precipitation behavior and a method for manufacturing the battery cell of the present invention, it is possible to observe lithium precipitation behavior in real time through the observation window while charging/discharging the battery cell for evaluating lithium precipitation behavior, and it is possible to check lithium precipitation behavior according to the electrochemical state of the battery cell.

BRIEF DESCRIPTION OF THE DRAWINGS

FIG. 6 is a schematic diagram of a third pouch according to an embodiment of the present invention.

FIG. 7 is a schematic diagram of a battery cell for evaluating a lithium precipitation behavior according to an embodiment of the present invention.

FIG. 8 is a capacity-voltage profile showing a charging condition of an experimental example of evaluating a lithium precipitation behavior using a battery cell for evaluating a lithium precipitation behavior according to an embodiment of the present invention.

FIG. 9 is a photograph showing lithium precipitation behavior generated in an overhang region by sections of FIG. 8.

DETAILED DESCRIPTION OF THE PREFERRED EMBODIMENTS

Figure 1:
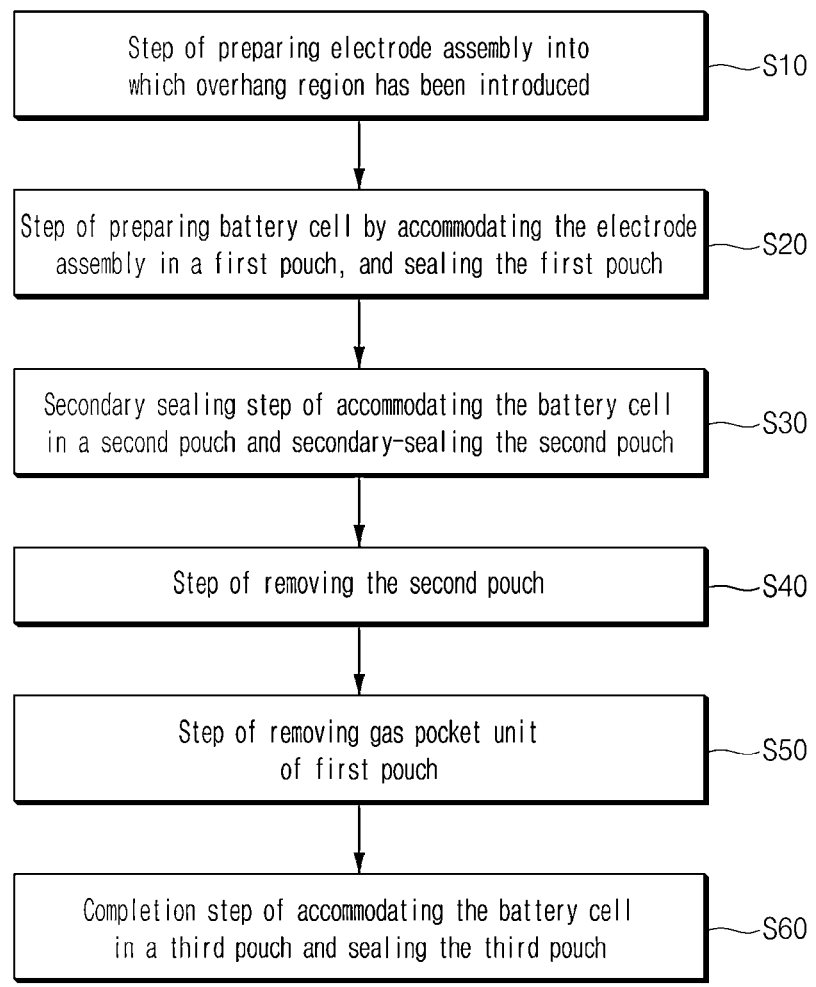
FIG. 1 is a flowchart of a method of manufacturing a battery cell for evaluating a lithium precipitation behavior according to the present invention.

Hereinafter, preferred embodiments of the present invention will be described in detail with reference to the accompanying drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

Also, throughout the specification, when an element is referred to as "including" an element, it is understood that the element may include other elements as well unless specifically stated otherwise.

FIG. 1 is a flowchart of a method of manufacturing a battery cell for evaluating a lithium precipitation behavior according to the present invention. Referring to FIG. 1, a method for manufacturing a battery cell for evaluating a lithium precipitation behavior according to the present invention includes: an electrode assembly preparation step (S10) of preparing an electrode assembly to which an overhang region, where a positive electrode protrudes from a negative electrode, is introduced; a battery cell preparation step (S20) of preparing a battery cell by accommodating the electrode assembly in a first pouch, injecting an electrolyte solution thereto, and sealing the first pouch; a secondary sealing step (S30) of accommodating the battery cell in a second pouch and secondary-sealing the second pouch; a second pouch removing step (S40) of performing formation for the secondary-sealed battery cell and removing the second pouch; a gas pocket unit removing step (S50) of degassing and re-sealing the battery cell, from which the second pouch has been removed, and removing a gas pocket unit of the first pouch; and a completion step (S60) of accommodating the battery cell, from which the gas pocket unit has been removed, in a third pouch having an observation window, and sealing the third pouch.

The battery cell for evaluating lithium precipitation behavior according to the manufacturing method of the present invention includes an overhang region in an electrode assembly accommodated in a battery case of a pouch, and an observation window is included in the pouch so that the electrode assembly inside the pouch can be observed. As such, the lithium precipitation behavior in the overhang region can be observed through the transparent observation window in real time while charging/discharging the battery cell without disassembling the battery cell, and electrochemical evaluation for the lithium precipitation behavior can be performed.

The electrode assembly preparation step (S10) is a step of preparing an electrode assembly to which an overhang region has been introduced. Generally when manufacturing an electrode assembly, in order to prevent lithium precipitation, the horizontal/vertical lengths of the negative electrode active material are set to be greater than those of the positive electrode active material, so that the negative electrode active material layer can cover the positive electrode active material layer. The present invention is characterized in that an overhang region, which is generated as the positive electrode protrudes from the negative electrode, is introduced by allowing the area of the negative electrode active material layer to be smaller than that of the positive electrode active material in order to artificially induce lithium precipitation so that the lithium precipitation behavior can be observed, unlike a general electrode assembly manufacturing method.

The overhang region can be formed by setting the horizontal or vertical length of a positive electrode to be greater than that of a negative electrode when preparing the positive electrode and the negative electrode, and the area of the overhang region can be appropriately adjusted according to the evaluation purpose.

In one specific example, the electrode assembly may include one or a plurality of bi-cell units having a structure of a positive electrode/negative electrode/positive electrode or monocell units having a structure of a positive electrode/negative electrode.

Figure 2:
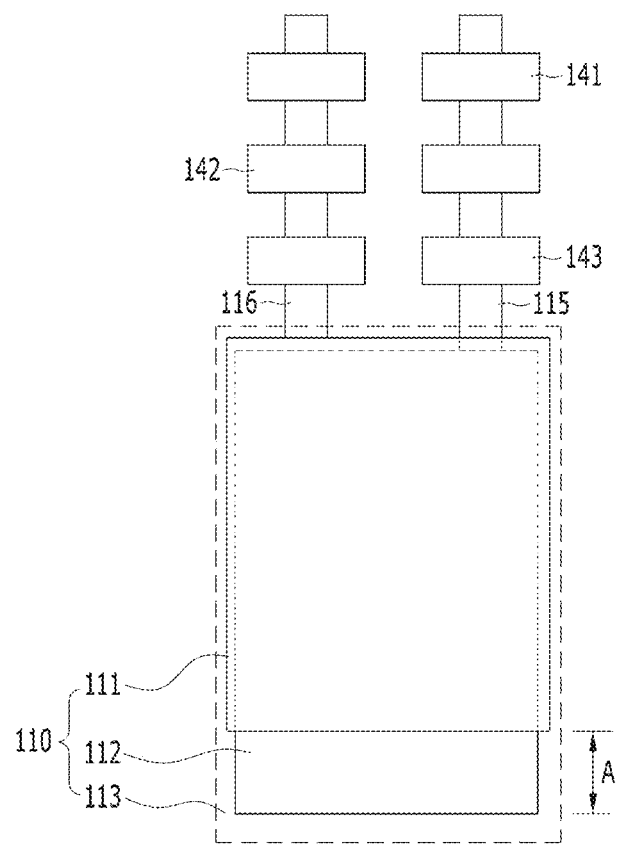
FIG. 2 is a schematic diagram of an electrode assembly according to an embodiment of the present invention.

FIG. 2 illustrates an electrode assembly according to an embodiment of the present invention. Referring to FIG. 2, in one specific example, an electrode assembly 110 of the present invention may be a monocell of a positive electrode 112/separator 113/negative electrode 111. In the monocell, the separator 113 is interposed between the positive electrode 112 and the negative electrode 111, and since the area of the separator 113 is greater than that of the positive electrode 112 and the negative electrode 111, the separator 113 protrudes from the positive electrode 112 and the negative electrode 111. Further, since the vertical length of the positive electrode 112 is greater than the vertical length of the negative electrode 111, the positive electrode 112 protrudes down from the end of the negative electrode 111, and the protruding portion is called an overhang region (A). If the charging or charging/discharging of the battery cell including the electrode assembly is repeated, lithium is precipitated in the overhang region.

Referring to FIG. 2, the positive electrode tab 116 is extended and protrudes from the positive electrode 112 of the electrode assembly 110, and the negative electrode tab 115 is extended and protrudes from the negative electrode 111. The positive electrode tab 116 and the negative electrode tab 116 protrude to the outside of the pouch, which is a battery case, respectively. Further, the positive electrode tab 116 is covered with 3 lead films, and the negative electrode tab 115 is covered with 3 lead films. In the present application, the three lead films are a first lead film 141, a second lead film 142, and a third lead film 143. Herein, it is assumed that the third lead film 143 is closest to the electrode assembly, and the first lead film 141 is farthest from the electrode assembly. The first lead film to the third lead film are interposed between the electrode tabs 115 and 116 and the pouch, which is the battery case, and when the pouch is sealed by them, the electrode tabs and the pouch are sealed in an integrally fused scheme. Namely, the pouch can be more firmly fusion-bonded with the electrode tab by using the lead films.

In the present invention, the positive electrode and the negative electrode can be prepared by applying an electrode mixture containing electrode active materials on the current collector, and drying the current collector, respectively. the electrode mixture may selectively further contain a binder, a conductive material, a filling material, etc.

Both weak magnetic and nonmagnetic metal ultrathins may be used as the current collector. The positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, or aluminum or stainless steel of which the surface has been treated with carbon, nickel, titanium, silver, or the like. The current collector may have fine irregularities on the surface thereof to increase the adhesion of the positive electrode active material, and various forms such as a sheet, a foil, and a net are possible.

The negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a sheet, a foil, and a net.

The positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \le y \le 0.7$); lithium nickel cobalt manganese composite oxide represented by the formula $Li_{1+z}Ni_bMn_cCo_{1-(o+c+d)}M_dO_{(2-e)}A_e$ such as $Li_{1+z}Ni_{1/3}Co_{1/3}Mn_{1/3}O_2$, $Li_{1+z}Ni_{0.4}Mn_{0.4}Co_{0.2}O_2$ etc. (wherein $-0.5 \le z \le 0.5$, $0.1 \le b \le 0.8$, $0.1 \le c \le 0.8$, $0 \le d \le 0.2$, $0 \le e \le 0.2$, b+c+d<1, M=Al, Mg, Cr, Ti, Si or Y, and A=F, P or Cl); olivine-based lithium metal phosphate represented by the formula $Li_{1+x}M_{1-y}M'_yPO_{4-z}X_z$ (wherein M=transition metal, preferably Fe, Mn, Co or Ni, M'=Al, Mg or Ti, X=F, S or N, and $-0.5 \le x \le 0.5$, $0 \le y \le 0.5$, $0 \le z \le 0.1$).

Examples of the negative electrode active material include carbon such as non-graphitized carbon and graphite carbon; metal complex oxide such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge;

Me': Al, B, P, Si, groups 1, 2, and 3 of the periodic table, halogen; $0<x\leq1$; $1\leq y\leq3$; $1\leq z\leq8$); lithium alloy; silicon alloy; tin alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

The filler is optionally used as a component for inhibiting expansion of an electrode, and is not particularly limited as long as it is a fibrous material without causing a chemical change in the battery. Examples of the filler include olefin polymers such as polyethylene and polypropylene; fibrous materials such as glass fibers and carbon fibers.

Other components, such as viscosity modifiers, adhesion promoters, and the like may be further included optionally or in combination of two or more. The viscosity modifier is a component that adjusts the viscosity of the electrode mixture so that the mixing process of the electrode mixture and the coating process on the current collector thereof may be easy, and may be added up to 30% by weight based on the total weight of the negative electrode mixture. Examples of such a viscosity modifier include carboxy methyl cellulose, polyvinylidene fluoride, and the like, but are not limited thereto. In some cases, the solvent described above may serve as a viscosity modifier.

The adhesion promoter is an auxiliary component added to improve the adhesion of the active material to the current collector and may be added in less than 10% by weight compared to the binder, and some examples thereof include oxalic acid, adipic acid, formic acid, acrylic acid derivatives, itaconic acid derivatives, and the like.

The separator is interposed between the positive electrode and the negative electrode, and an insulating thin film having high ion permeability and mechanical strength is used. The pore diameter of the separator is generally 0.01 to 10 micrometers, and the thickness is generally 5 to 300 micrometers. Examples of such a separator include olefin-based polymers such as polypropylene which is chemically resistant and hydrophobic; a sheet or a nonwoven fabric made of glass fiber, polyethylene or the like. When a solid electrolyte such as a polymer is used as the electrolyte, the solid electrolyte may also serve as a separator.

The battery cell preparation step (S20) is a step of accommodating the electrode assembly having the overhang region in the first pouch and sealing the first pouch by injecting the electrolyte solution.

The first pouch is a pouch made of a transparent material so that the electrode assembly accommodated inside the first pouch can be observed from the outside of the first pouch and is preferably made of a material through which the electrolyte solution cannot be permeated. Specific examples thereof include polyethylene terephthalate or polypropylene.

The electrolyte solution is a general nonaqueous solution used in the manufacture of secondary batteries, and may specifically include an organic solvent and optionally a lithium salt.

The decomposition of the organic solvent by the oxidation reaction, etc. can be minimized in the charging/discharge process of the secondary battery, and there is no limit if it can exert desired characteristics together with additives. For example, carbonate-based and propionate-based materials can be used. These may be used alone, or two or more of them may be used in combination.

Examples of such carbonate compounds among the above non-aqueous organic solvents include any one selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC) and vinylene carbonate (VC), or a mixture of two or more thereof.

In addition, a typical example of the propionate-based compound includes any one selected from the group consisting of ethyl propionate (EP), propyl propionate (PP), n-propyl propionate, iso-propyl propionate, n-butyl propionate, iso-butyl propionate and tert-butyl propionate, or a mixture of two or more thereof.

In addition, examples of the non-aqueous organic solvent may include N-methyl-2-pyrrolidone, propylene carbonate, ethylene carbonate, butylene carbonate, dimethyl carbonate, diethyl carbonate, gamma-butyrolactone, 1,2-dimethoxy ethane, 2-methyl tetrahydrofuran, dimethyl sulfoxide, 1,3-dioxolone, formamide, dimethylformamide, dioxolone, acetonitrile, nitromethane, methyl formate, methyl acetate, phosphate triester, trimethoxy methane, dioxolane derivatives, sulfolane, methyl sulfolane, 1,3-dimethyl-2-imidazolidinone, propylene carbonate derivatives, tetrahydrofuran derivatives, ethers, methyl propionate, and ethyl propionate.

Any lithium salt commonly used in the electrolyte solution for lithium secondary batteries can be used as the lithium salt contained in the electrolyte solution of the present invention. For example, the lithium salt includes Li+ as a cation and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $F_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$ and $(CF_3CF_2SO_2)_2N^-$. The lithium salt can be used alone or, two or more thereof may be used in combination. The amount of the lithium salt can be appropriately changed within a usable range, and in order to obtain the optimal effect of forming a corrosion-proof film of the surface of the electrode, lithium salt of 0.8 to 1.5 M concentration can be contained in the electrolyte solution.

Figure 3:
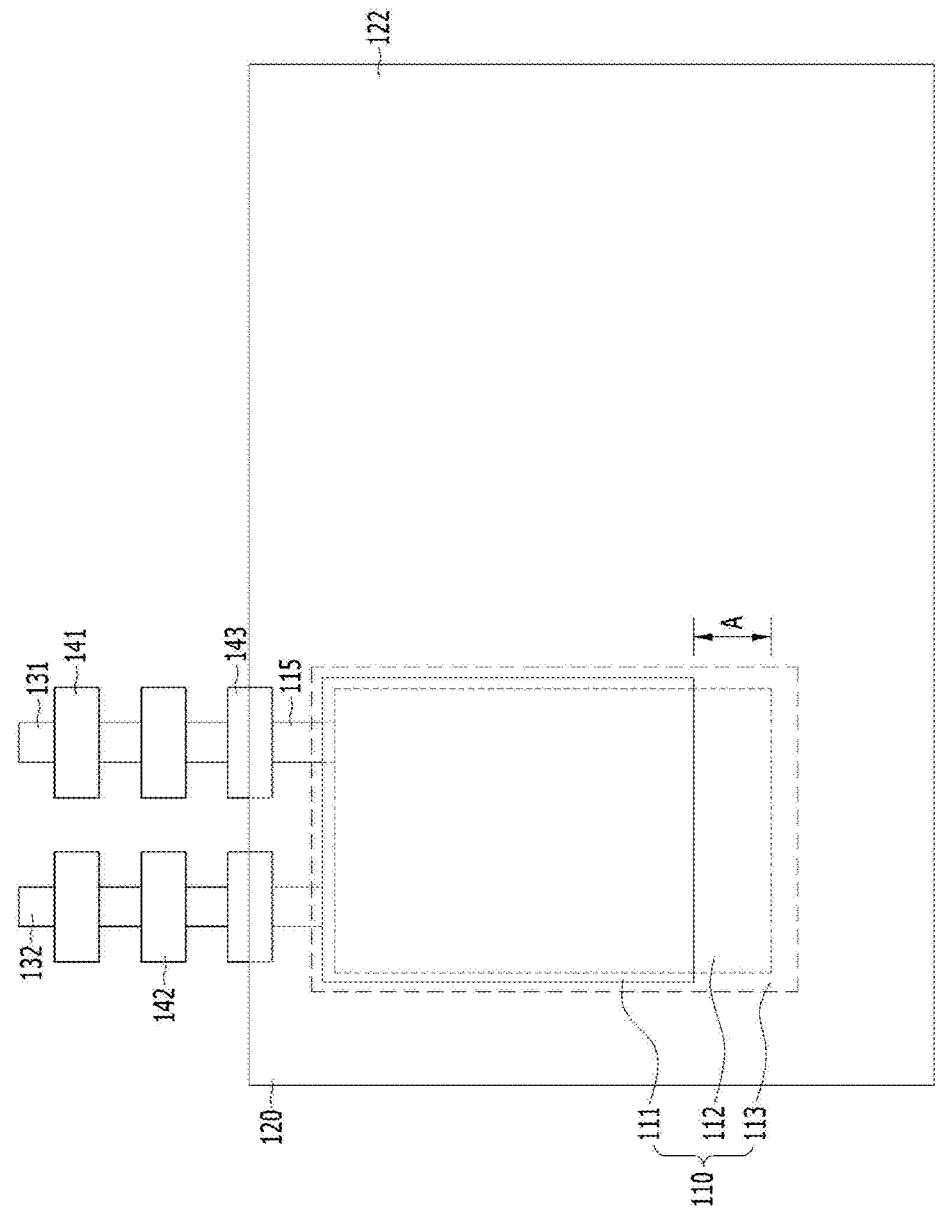
FIG. 3 is a schematic diagram showing one embodiment of a battery cell prepared according to a battery cell manufacturing step (S20) of the present invention.

FIG. 3 illustrates a battery cell prepared according to the battery cell preparation step (S20) according to an embodiment of the present invention. Referring to FIG. 3, the first pouch 120 may be divided into a receiving portion (not shown) for accommodating an electrode assembly, and a gas pocket unit 122, and the electrode assembly 110 is accommodated in the receiving portion (not shown) of the first pouch 120. An overhang region (A) is introduced to the electrode assembly, and since the first pouch is transparent, the electrode assembly accommodated inside can be visually observed from the outside of the first pouch. Further, the positive electrode tab and the negative electrode tab protrude from the first pouch 120 in a state that the positive electrode tab and the negative electrode tab are connected to the positive electrode lead 132 and the negative electrode lead 131, respectively. The positive electrode lead 132 is covered by 3 lead films 141, 142 and 143, and the negative electrode lead 131 is also covered by 3 lead films 141, 142 and 143. Further, since the battery cell preparation step (S20) includes a process of sealing the first pouch and the third lead film together, the first pouch 120 is heat-fused with the third lead film 143 to seal the battery cell.

The secondary sealing step (S30) includes a process of accommodating the battery cell in the second pouch and sealing the second pouch. Since the first pouch is used to observe the electrode assembly from an outside, it should be made of a transparent material and thus it does not include a barrier layer. Herein, it is possible to maintain a certain level of sealing force with the first pouch, but since part of the electrolyte solution or internal gas generated during formation may leak to the outside, a secondary sealing step of sealing the battery cell sealed with the first pouch is necessary before performing the formation process.

In one specific example, the second pouch is a pouch of a laminate sheet including a barrier layer of aluminum. The second pouch has a structure including a material-blocking aluminum barrier layer, a heat-fusible first resin layer, and a second resin layer as an external coating layer. The second resin layer is made of a material capable of insulating the barrier layer from the outside and having excellent durability and rigidity, to thereby protect a laminate sheet pouch from the outside. The first resin layer may be composed of a structure containing an unstretched polypropylene as a polypropylene resin layer having excellent fatigue resistance and chemical resistance.

In one specific example, in the secondary sealing step (S30), the second pouch and the first lead film are sealed together. By sealing the second pouch and the first lead film together, the sealing force between the electrode lead and the second pouch can be improved.

Figure 4:
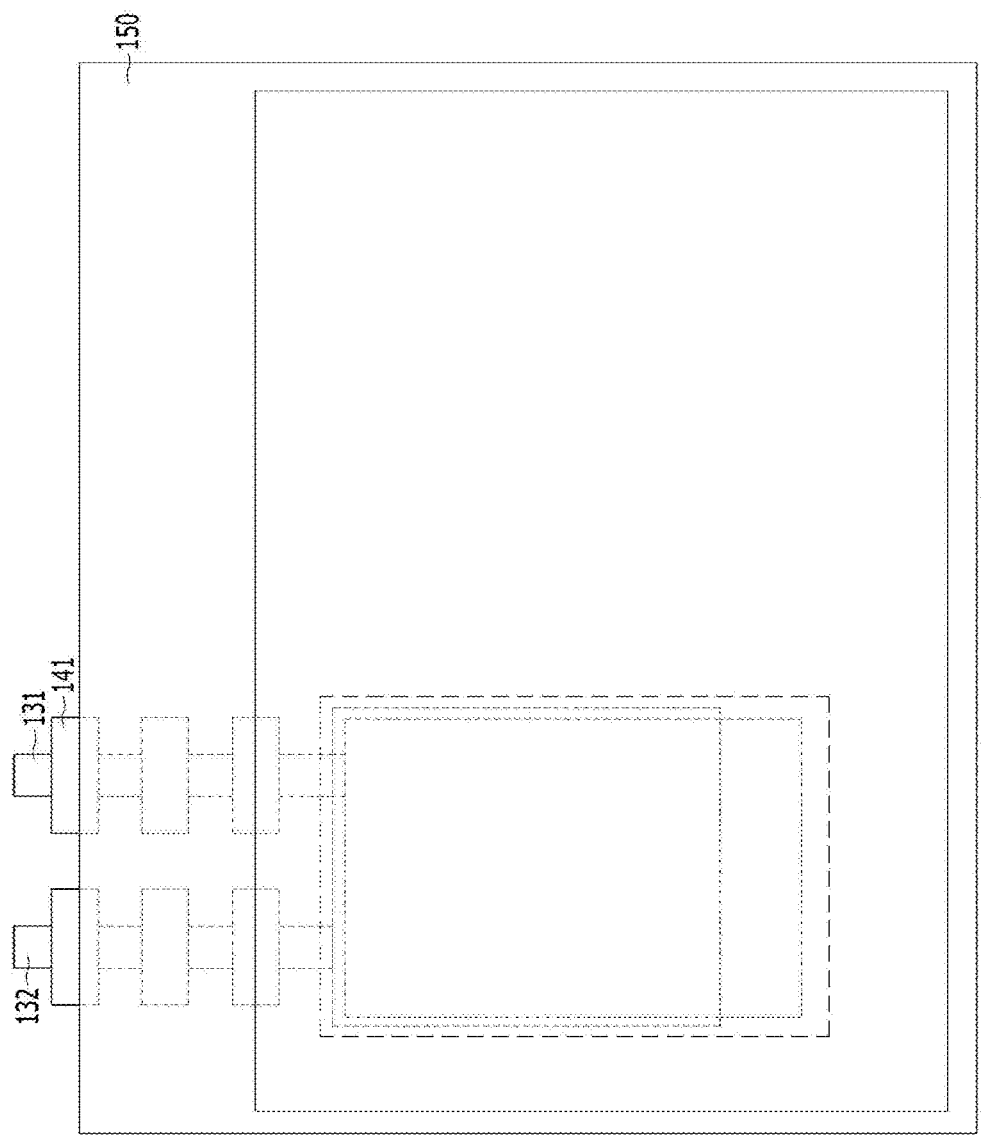
FIG. 4 is a schematic diagram showing an embodiment of a battery cell having completed a secondary sealing step (S30) of the present invention.

FIG. 4 is a perspective view showing an embodiment of a battery cell having completed a secondary sealing step (S30) of the present invention. The electrode assembly and the electrolyte solution are accommodated in the first pouch, which is then sealed, which is then accommodated in the second pouch 150, which is shown in FIG. 4 as the battery cell having completed the secondary sealing step (S30). Hence, the volume of the second pouch is preferably a little bit greater than the volume of the battery cell sealed by the first pouch so that the second pouch can accommodate the battery cell sealed by the first pouch. The negative electrode lead 131 and the positive electrode lead 132 protrude to the outside of the second pouch 150, respectively, and the negative electrode lead 131 and the positive electrode lead 132 are sealed in the second pouch 150 by the first lead film 141.

The second pouch removing step (S40) is a step of performing a formation process for the battery cell sealed with the second pouch and the removing the second pouch. In the present application, formation includes an initial charging process of charging a battery cell with a predetermined charge rate (SOC: state of charge) and a process of pressing the battery cell by a predetermined pressure before, during or after the initial charging, selectively, for activation of the battery cell. Further, the predetermined charge rate may be SOC 10% to 70% or SOC 15% to 60%. The formation process can prevent a gas trap in which gas, which is generated during the initial charge, is trapped inside the electrode assembly, by applying pressure simultaneously with the initial charge or before/after the initial charge. When the formation process is completed, the first lead film is removed together with the second pouch.

The gas pocket unit removing step (S50) of the first pouch includes a process of degassing and re-sealing the battery cell, from which the second pouch has been removed, and removing the gas pocket unit of the first pouch.

Figure 5:
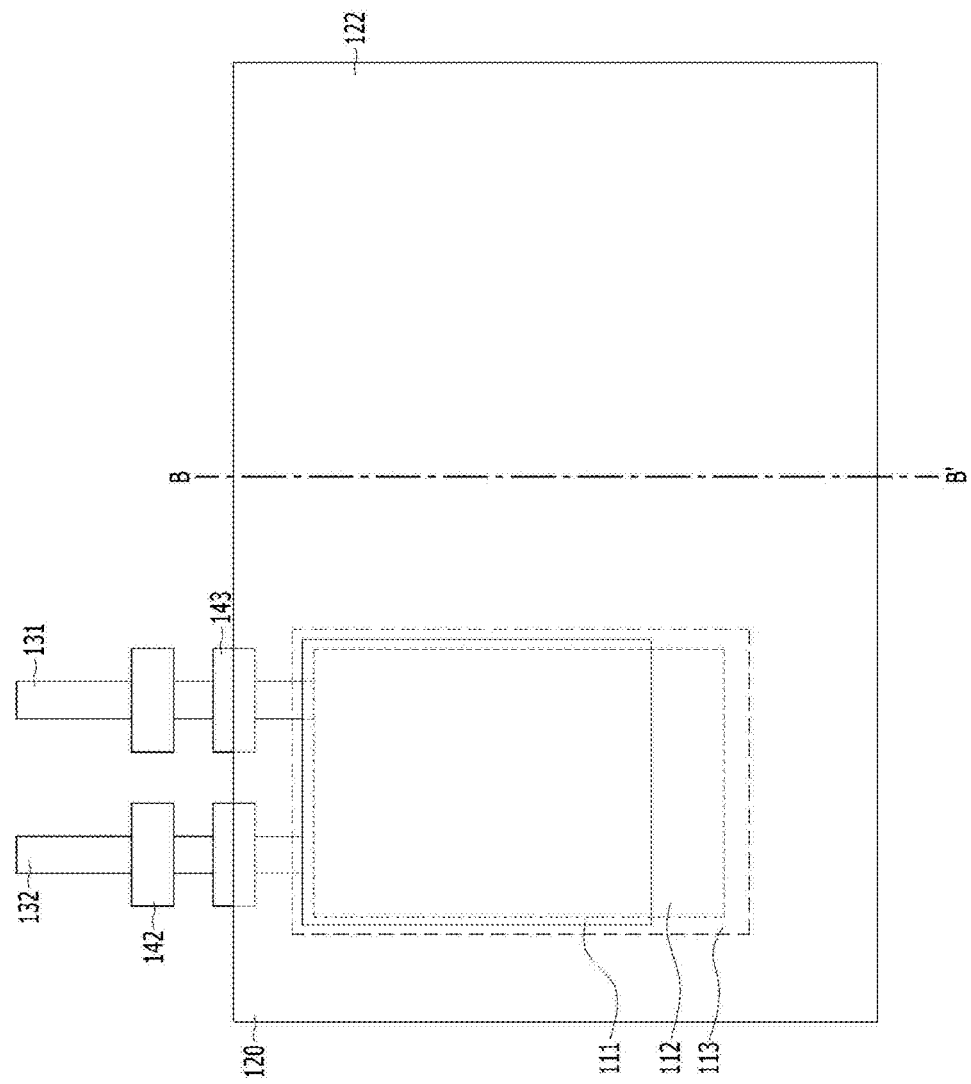
FIG. 5 is a schematic diagram showing a battery cell from which a second pouch has been removed, according to a second pouch removing step (S40) of the present invention.

FIG. 5 is a schematic diagram showing a battery cell from which a second pouch has been removed, according to the second pouch removing step (S40). Referring to FIG. 5, as the second pouch is removed, a battery cell sealed with the first pouch is obtained. The first pouch contains gas generated during the formation process, and a degassing process is performed to discharge the internal gas to the outside. The internal gas generated during the formation process is collected in the gas pocket unit. The degassing process includes the process of perforating the through hole connected to the inside at the gas pocket unit of the first pouch and discharging gas through the through hole. When the discharge of gas is completed, the first pouch is re-sealed along B-B' between the receiving portion and the gas pocket unit by a heat fusion scheme, and the gas pocket unit is cut and removed.

After removing the gas pocket unit of the first pouch, the completion step (S60) of accommodating the battery cell, from which the gas pocket unit has been removed, in the third pouch and sealing the third pouch is performed. The completion step (S60) includes a process of accommodating a battery cell, from which the gas pocket unit of the first pouch has been removed, in the third pouch having an observation window, and sealing the third pouch.

The third pouch is a pouch of a laminate sheet including an aluminum barrier layer as in the second pouch. The material of the third pouch is the same as that of the second pouch. Since the material of the second pouch was described above in detail, the description of the material of the third pouch is omitted here.

FIG. 6 is a schematic diagram of a third pouch according to an embodiment of the present invention. The third pouch is characterized in having an observation window. Referring to FIG. 6, the third pouch 160 has a pouch type of a laminate sheet including a barrier layer of aluminum, a through hole is formed on a region corresponding to an overhang region, and the through hole becomes an observation window 162. In order to block the through hole, which is used as the observation window, from the external side, the through hole region is covered with a transparent film. At this time, the transparent film is positioned so that the entire region of the through hole is included in the transparent film. The transparent film is preferably an acrylic film having excellent visibility. Further, in order to fix the transparent film on the third pouch, an adhesive tape is attached or adhesive is applied on the third pouch along the edge of the transparent film, to thereby prepare an observation window. As illustrated in FIG. 6, the shape of the observation window may be rectangular or circular, but the shape is preferably rectangular to fit the shape of the battery cell.

The present invention provides a battery cell for evaluating a lithium precipitation behavior prepared according to the above preparation method. FIG. 7 illustrates a battery cell for evaluating a lithium precipitation behavior prepared by the completion step (S60). Referring to FIG. 7, an electrode assembly, into which an overhang region (A), where the positive electrode plate protrudes from the negative electrode plate, is introduced, and an electrolyte solution are accommodated in a transparent pouch 120, which is then sealed to thereby prepare a battery cell, which is then sealed by a pouch 160 of an aluminum laminate sheet, to thereby prepare a battery cell. Herein, the pouch of the aluminum laminate sheet includes an observation window at a portion corresponding to the overhang region. Specifically, the battery cell sealed with the first pouch 120 is accommodated in the third pouch 160, and the third pouch 160 is sealed with the positive electrode lead 131 and the negative electrode lead 132 by the second lead film 142. Further, the electrode assembly 110 having the overhang region (A) can be observed from the outside of the third pouch through the observation window 162 included in the third pouch. Therefore, it is possible to perform electrochemical evaluation for the battery cell in real time while checking lithium precipitation behavior in the overhang region through the observation window.

In one specific example, the transparent pouch may be made of polyethylene terephthalate or polypropylene.

In one specific example, the observation window is formed by covering the through hole, formed at a region corresponding to the overhang region, with a transparent film, in the pouch of the laminate sheet, and the transparent film is preferably an acrylic film. The transparent film is attached on the pouch of the aluminum laminate sheet by using a polyimide adhesive tape.

Examples

An electrode assembly (monocell) having a structure, in which a separator is interposed between the positive electrode and the negative electrode, was prepared. At this time, the electrode assembly was prepared so that there is an overhang region which is generated as the positive electrode protrudes from the negative electrode because the vertical length of the positive electrode is greater than that of the negative electrode.

A transparent pouch made of polyethylene terephthalate was selected as a first pouch. The electrode assembly, into which the overhang region has been introduced, is accommodated in the first pouch, and an electrolyte solution was injected into the first pouch. Thereafter, the first pouch was sealed together with a third lead film covering the point corresponding to ⅓ of the length of the electrode tab extended from the electrode assembly.

The aluminum laminate sheet of nylon/aluminum/polyethylene was selected as the second pouch, and the sealed battery cell was accommodated in the second pouch. Thereafter, the second pouch was sealed together with the first lead film covering the upper end point of the electrode tab extended from the electrode assembly.

Further, after performing the formation process including the primary charge of the battery cell for 3 hours at the charge rate of 0.1 C, the second pouch was removed together with the first lead film.

The degassing process of discharging the internal gas of the battery cell, from which the second pouch has been removed, is performed, and the boundary between the gas pocket unit and the electrode assembly receiving portion of the first pouch is re-sealed, and then the gas pocket unit of the first pouch was removed.

A third pouch having an observation window illustrated in FIG. 6 was prepared. The third pouch has a through hole at a portion of the laminate sheet which is the same as the second pouch. The through hole was covered with a transparent acrylate film, and the transparent film was fixed at the third pouch by using a polyimide adhesive tape.

The battery cell, from which the gas pocket unit has been removed, is accommodated in the third pouch, and the overhang region is set to be observed through the observation window. Thereafter, the third pouch was sealed together with the second lead film covering ⅔ of the length of the electrode tab extended from the electrode assembly, to thereby complete production of the battery cell for evaluating lithium precipitation behavior.

Experimental Example

The lithium precipitation behavior of the overhang region was observed in real time through the observation window while charging the battery cell for evaluating the lithium precipitation behavior prepared in the above example (CC charge up to 4.3V, 8.25 mA, C-rate of 0.1 C), and the results are shown in FIGS. 8 and 9.

FIG. 8 shows a capacity-voltage profile according to the charging condition by (A) to (D) sections, and FIG. 9 shows photographs of overhang regions of (A) to (D) sections of FIG. 8.

Referring to FIGS. 8 to 9, lithium was not precipitated up to (A) section, a little lithium is started to be precipitated in (B) section, lithium is continued to be precipitated in the point where the lithium was precipitated in (C) section, and the amount of lithium precipitated increased in (D) section, compared to (C) section.

According to the battery cell for evaluating lithium precipitation behavior, it is possible to observe lithium precipitation behavior in real time through the observation window while charging/discharging the battery cell for evaluating lithium precipitation behavior, and it is possible to check lithium precipitation behavior according to the electrochemical state of the battery cell.

The invention claimed is:

1. A method for manufacturing a battery cell for evaluating a lithium precipitation behavior, comprising:
    preparing an electrode assembly to which an overhang region, where a positive electrode protrudes from a negative electrode, is introduced;
    preparing a battery cell including accommodating the electrode assembly in a first pouch, injecting an electrolyte solution thereto, and sealing the first pouch;
    accommodating the battery cell in a second pouch and secondary-sealing the second pouch;
    forming the secondary-sealed battery cell and removing the second pouch;
    degassing and re-sealing the battery cell, from which the second pouch has been removed, and removing a gas pocket unit of the first pouch; and
    accommodating the battery cell, from which the gas pocket unit has been removed, in a third pouch having an observation window, and sealing the third pouch,
    wherein the electrode assembly includes a positive electrode tab extends and protrude from the positive electrode, and the overhang region is not formed on the positive electrode tab.

2. The method of claim 1, wherein the electrode assembly includes one or a plurality of bi-cell units having a structure of a positive electrode/negative electrode/positive electrode or monocell units having a structure of a positive electrode/negative electrode.

3. The method of claim 1, wherein a positive electrode lead and a negative electrode lead included in the electrode assembly are each covered by first to third lead films, and wherein the third lead film is closest to the electrode assembly and the first lead film is farthest from the electrode assembly.

4. The method of claim 3, wherein the preparing of the battery cell further includes sealing the first pouch and the third lead film together.

5. The method of claim 3, further comprising sealing the second pouch and the first lead film together.

6. The method of claim 3, further comprising sealing the third pouch and the second lead film together.

7. The method of claim 1, wherein the first pouch includes a pouch including transparent polyethylene terephthalate or polypropylene material.

8. The method of claim 1, wherein the second pouch includes a pouch including a laminate sheet including a barrier layer of aluminum.

9. The method of claim 1, wherein the third pouch includes a pouch including a laminate sheet including a barrier layer of aluminum, and wherein in the third pouch, a through hole is disposed on a portion corresponding to the overhang region, and the through hole is covered with an acrylic film to thereby form the observation window.

10. A method for evaluating a lithium precipitation behavior, the method comprising:

performing the method for manufacturing the battery cell for evaluating the lithium precipitation behavior according to claim 1; and charging and discharging the battery cell and observing the lithium precipitation behavior in the overhang region through the observation window in real time.

* * * * *